United States Patent [19]

Saito et al.

[11] Patent Number: 5,390,051
[45] Date of Patent: Feb. 14, 1995

[54] MIRROR ANGLE ADJUSTMENT STRUCTURE FOR OPTICAL SYSTEM

[75] Inventors: Taizo Saito, Okayama; Morio Takizawa; Hirokazu Yoshino, both of Saitama, all of Japan

[73] Assignee: Asahi Kogaku Kogyo Kabushiki Kaisha, Tokyo, Japan

[21] Appl. No.: 872,837

[22] Filed: Apr. 23, 1992

[30] Foreign Application Priority Data

Apr. 24, 1991 [JP] Japan .................... 3-59325[U]

[51] Int. Cl.⁶ .................... G02B 7/182; A47G 1/24
[52] U.S. Cl. .................... 359/872; 359/881; 248/468; 248/476
[58] Field of Search .............. 359/871, 881, 872, 873; 248/468, 476, 477, 478

[56] References Cited

U.S. PATENT DOCUMENTS

| | | | |
|---|---|---|---|
| 3,879,112 | 4/1975 | Hickey | 359/874 |
| 4,648,692 | 3/1987 | Kinoshita | 248/476 |
| 4,869,582 | 9/1989 | Nakajima et al. | 359/871 |
| 4,918,306 | 4/1990 | Saito | 250/235 |
| 4,948,243 | 8/1990 | Saito | 359/881 |
| 4,984,882 | 1/1991 | Boyd | 248/468 |

*Primary Examiner*—Loha Ben
*Assistant Examiner*—Darryl Collins
*Attorney, Agent, or Firm*—Sandler Greenblum & Bernstein

[57] ABSTRACT

A mirror angle adjustment structure is provided for an optical system, such as a laser scanning unit. The structure comprises a support projection projected from a mirror support member at a position corresponding to an end along the lengthwise direction of the mirror, an adjustment screw member disposed at the other end of the mirror corresponding to another end across the mirror and passed through and threaded with the mirror support member from the side where the mirror is disposed, and an urging mechanism, such as a leaf spring, for urging the mirror towards the support projection and the adjustment screw member.

21 Claims, 4 Drawing Sheets

MIRROR ANGLE ADJUSTMENT STRUCTURE FOR OPTICAL SYSTEM

BACKGROUND OF THE INVENTION

The present invention relates towards a mirror angle adjustment structure provided for introducing a light beam to an object in an optical system for a laser beam scanning unit, electronic copying machine and the like.

Conventionally, in the optical system for a laser beam printing device, electronic copying machine and the like the outside periphery of a photoconductive drum, the outside peripheral surface of which is formed of a photoconductive material, is scanned with a laser beam modified based on image and character information, and the information is printed on a recording paper by making use of an electrophotographic method. A light beam is introduced to a desired portion in such a manner that a light beam path is bent after the light beam is reflected from a mirror. This arrangement increases the freedom of positioning disposition of a light source and optical elements to thereby enable the device to be made compact as a whole and the length of a light path necessary for achieving an optical performance to be obtained.

The mirror is mounted on the chassis of the device, the unit base for an optical system unit or the like at a predetermined angle for reflecting an incident light beam in a desired direction, and a mechanism for adjusting the angle of the mirror is disposed on the portion where the mirror is disposed so that the direction in which the light beam is reflected can be finely adjusted.

The mirror angle adjustment mechanism is arranged such that, for example, a support projection is projected from a mirror support member such as the chassis, unit base or the like at a position corresponding to an end, along the lengthwise direction of the mirror. An adjustment screw disposed at the other end of the mirror corresponding to the above end across the mirror is passed through and threadedly engaged with the mirror support member from the backside thereof. The extreme end of the adjustment screw is projected to tile mirror side. Further, an urging means such as a leaf spring or the like is provided for pressing the mirror to the support projection and adjustment screw. The mirror is fixed by being pressed against the support projection and adjustment screw by the urging means, and when the adjustment screw is turned from the backside of the mirror support member in an advancing or retracting direction, an angle of the mirror can be adjusted in such a manner that the mirror is swung about the support projection serving as a fulcrum.

Nevertheless, with the aforesaid mirror angle adjustment structure, the angle must be adjusted by turning the adjustment screw from tile backside of the mirror mounting surface and thus this adjustment operation is very time consuming.

SUMMARY OF THE INVENTION

An object of the present invention is to provide a mirror angle adjustment structure by which an angle of a mirror can be simply adjusted from the side where the mirror is mounted.

To achieve the above object, the present invention comprises a support projection projected from a mirror support member at a position corresponding to an end along the lengthwise direction of the mirror and an adjustment screw member disposed at the other end of the mirror corresponding to the end across the mirror. The screw is passed through and threaded into the mirror support member from the side where tile mirror is disposed, and an urging means for urging tile mirror to the side of the support projection and the adjustment screw member.

With this arrangement, an angle of the mirror can be simply adjusted by turning the adjustment screw members in an advancing or retracting direction from the side where the mirror in mounted.

DESCRIPTION OF THE ACCOMPANYING DRAWINGS

DESCRIPTION OF THE EMBODIMENT

An embodiment of the present invention will be described with reference to the drawings.

Figure 1:
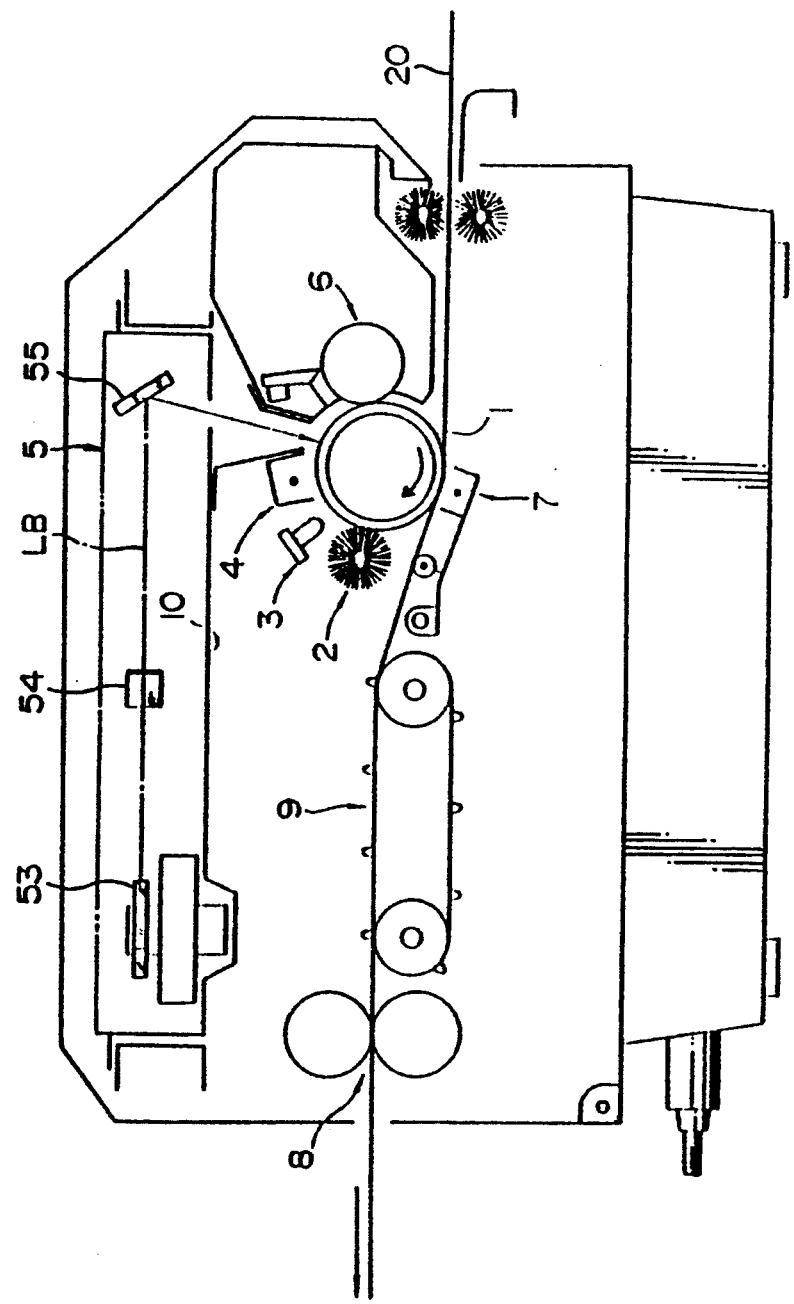
FIG. 1 is a schematic arrangement diagram of a laser beam printing device as a whole provided with a laser beam scanning unit to which an embodiment of a mirror angle adjustment structure for an optical system according to the present invention is applied.

FIG. 1 is a schematic arrangement diagram of a laser beam printing device as a whole provided with a laser beam scanning unit to which an embodiment of a mirror angle adjustment structure for an optical system according to the present invention is applied.

This laser beam printing device, used as an output device for a computer and the like, scans a photoconductive material on the surface of a rotating photoconductive drum 1 by a laser beam modified based on input characters or image information and prints the characters or information as an output on a fanfold paper 20 as a continuous paper by the use of an electrophotographic method.

A toner cleaner 2, discharging unit 3, charging unit 4, scanning optical system 5 by which a laser beam LB is introduced onto the photoconductive drum 1, developing unit 6 and transfer unit 7 are disposed, respectively, In a predetermined order around the periphery of the photoconductive drum 1 along the rotating direction thereof shown by the arrow in FIG. 1. The transfer unit 7 is positioned below the photoconductive drum 1, a fixing unit 8 is disposed at a position to which the fanfold paper 20 is fed (the left side in FIG. 1), and a tractor 9 is disposed in a feed path along which the fanfold paper 20 is fed from the photoconductive drum 1 to the fixing unit 8.

The surface of the photoconductive drum 1 is scanned (exposed) by a laser beam LB from the scanning optical system 5 in the rotating axis (main scanning) direction of the photoconductive drum 1 and, as the photoconductive drum 1 is rotated (auxiliary scanned), a latent image formed on the surface of the photoconductive drum 1 is developed as a toner image by the developing unit 6. The toner image is transferred by the transfer unit 7 onto the fanfold paper 20 fed from the front side to the rear side (from the right side to the left side in FIG. 1) below the photoconductive drum 1, and the toner image transferred onto the fanfold paper 20 is fixed by the fixing unit 8 and then output.

Figure 2:
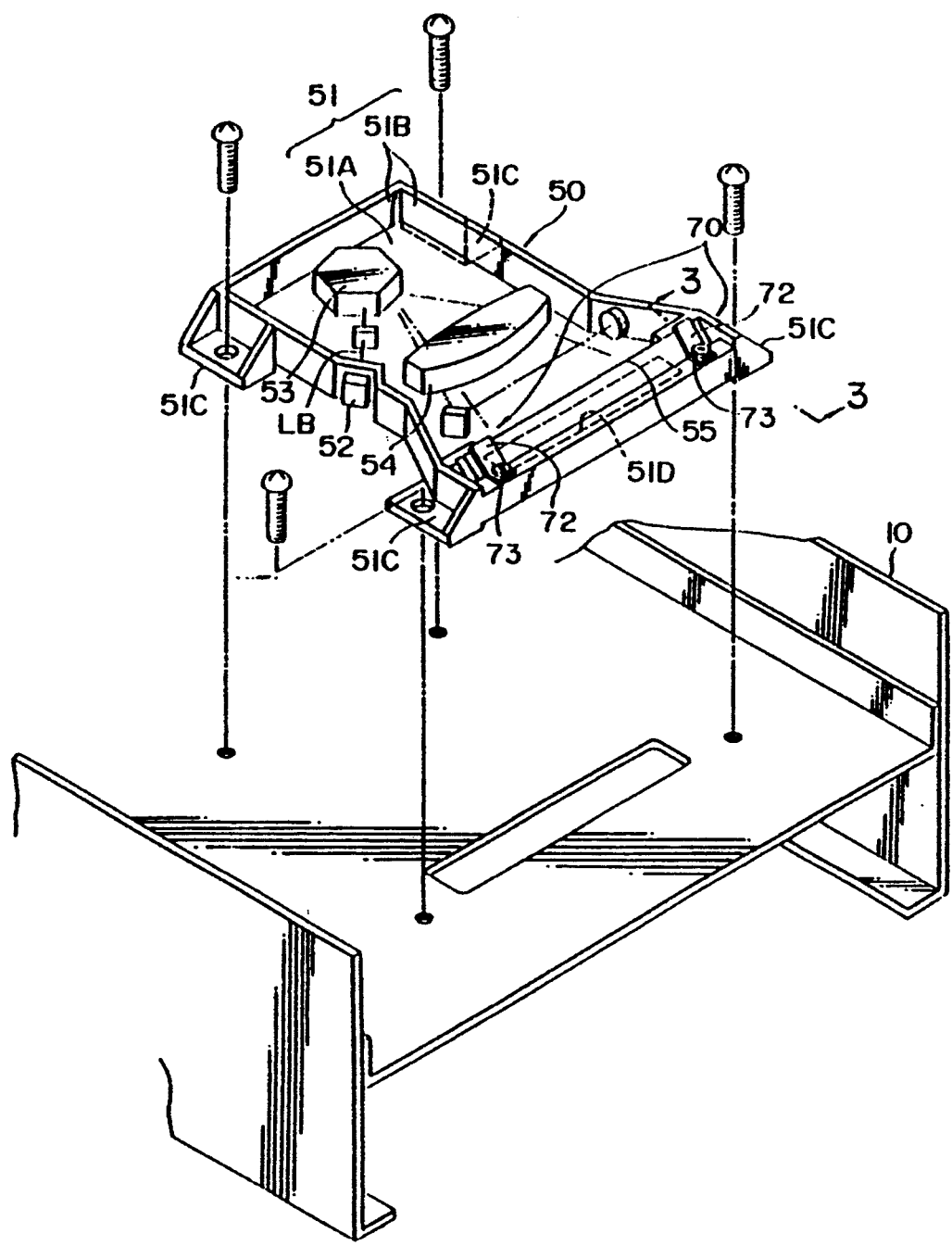
FIG. 2 is a perspective view of a scanning optical system unit to which an embodiment of a mirror angle adjustment structure for an optical system according to the present invention is applied.

The scanning optical system 5 is located above the photoconductive drum 1 and arranged as a scanning optical system unit 50 composed of optical elements disposed on a unit base 51 to have a predetermined positional relationship, as shown as the perspective view in FIG. 2, and this scanning optical system unit 50 is mounted on the chassis 10 of the laser beam printing device.

The scanning optical system unit 50 is composed of optical elements such as a semiconductor laser 52 for emitting the laser beam LB, polygon mirror 53, fθ lens 54, mirror 55 and the like, each fixedly disposed at a predetermined position on the unit base 51 with precise accuracy so as to have a predetermined relative distance and angle, respectively.

The unit base 51 is integrally formed of plastics such that a flat base 51A is surrounded by a circumferential wall 51B and leg fixing portions 51C are projected outwardly from the four corners of the flat base 51A. The optical elements are disposed on the upper surface of the base 51A serving as an optical elements disposing area.

The polygon mirror 53, fixed to the spindle of a not shown drive motor and rotated thereby, is disposed on one side of the optical elements disposing area, the mirror 55 is disposed on the other side thereof, the fθ lens 54 is disposed in the light path from the polygon mirror 53 to the mirror 55, and the semiconductor laser 52 is fixed on one side of the circumferential wall 51B so that it can emit the laser beam LB to the polygon mirror 53. The base 51A is provided with an opening 51D having a lengthwise distance shorter than the mirror 55 at the position thereof below the mirror 55.

With the scanning optical system unit 50 arranged as described above, the laser beam LB emitted from the semiconductor laser 52 is reflected from the periphery of the rotating polygon mirror 53, scanned within the range of a predetermined angle, passed through the fθ lens 54, reflected from the mirror 55 and then emitted downwardly at a predetermined angle through the opening 51D.

The scanning optical system unit 50 is fixed at the predetermined position on the chassis 10 of the laser beam printing device by screws passing through the leg fixing portions 51C. In this fixed state, the opening 51D of the scanning optical system unit 50 is located obliquely upwardly of the photoconductive drum 1 with the lengthwise direction thereof parallel with the rotational axis of the photoconductive drum 1. Thus, the emitted laser beam LB scans the photoconductive material on the outside periphery of the photoconductive drum 1 in the rotational direction thereof through the opening 51D.

Figure 3:
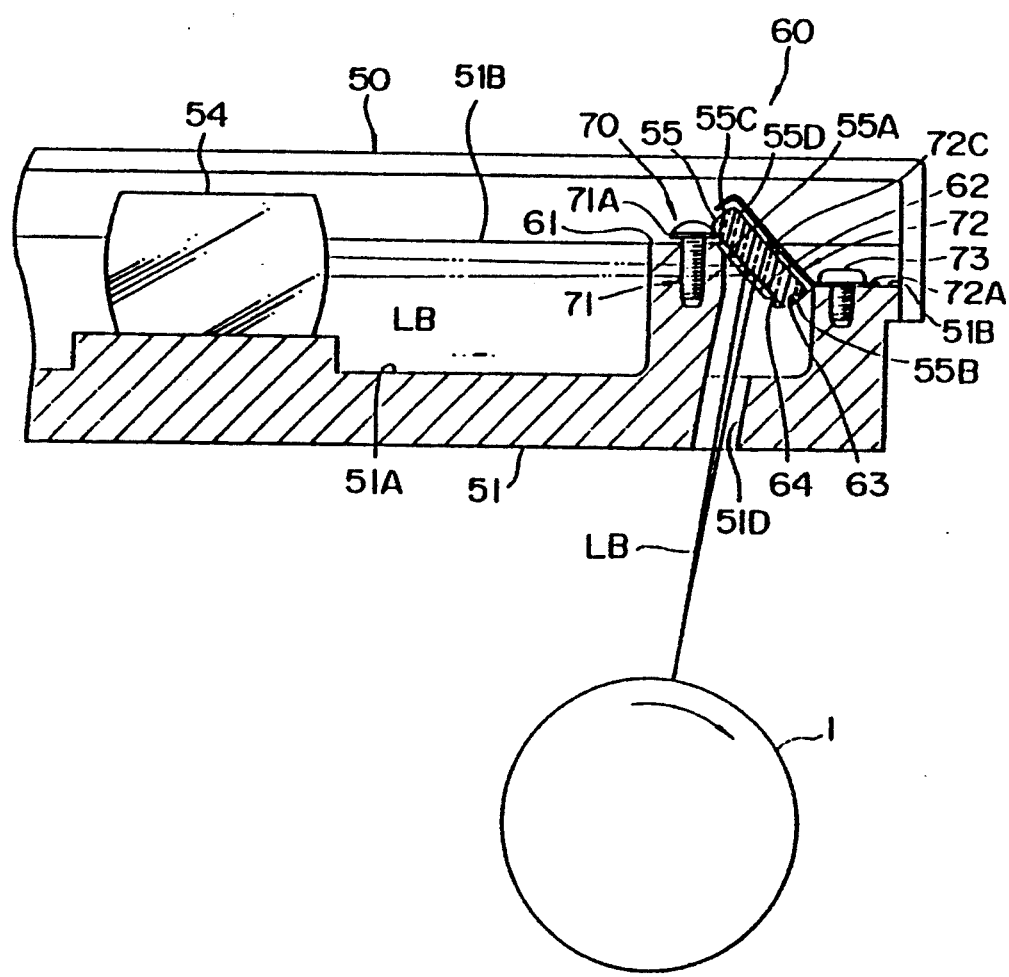
FIG. 3 is an enlarged cross sectional view corresponding to the 3—3 cross section of FIG. 2.
Figure 4:
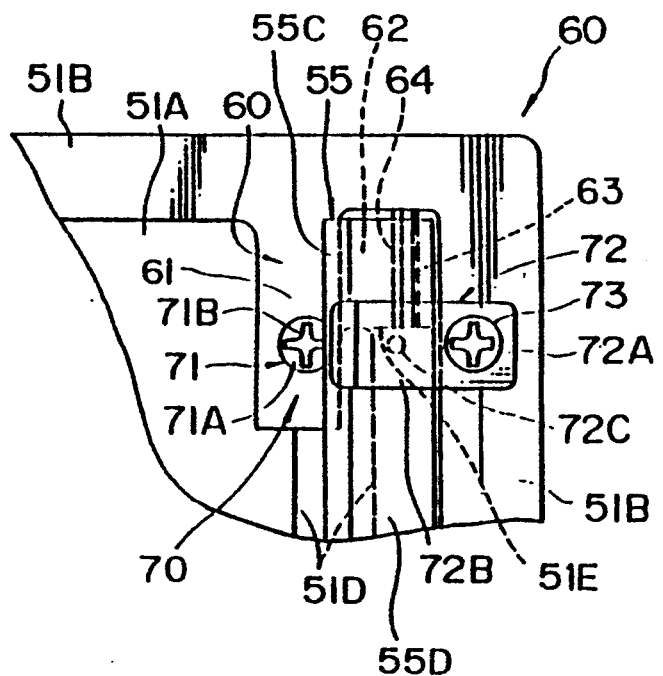
FIG. 4 is a plan view of a holding and angle adjustment mechanism disposed at an end of a mirror.

The rectangular mirror 55 has a predetermined width, predetermined thickness and length longer by a predetermined amount than the scanning range at the position where tile mirror 55 is disposed, and an aluminum reflection film is formed on a surface (reflection surface 55A) of the mirror 55 by vacuum deposition. The mirror 55 is mounted to mirror support portions 60 defined to the opposite ends of the opening 51D at the opposite ends in the lengthwise direction of the mirror 55 in such a manner that the reflection surface 55 thereof is directed downwardly. An angle of the mirror 55 can be adjusted by a holding and angle adjustment mechanism 70, as an embodiment of a mirror angle adjustment structure for an optical system according to the present invention. An embodiment of the present invention, shown in FIG. 3, corresponding the 3—3 cross section of FIG. 2, and FIG. 4 as a partial plan view, showing the vicinity of one of the mirror support portions 60. In this case, the mirror 55 is mounted at a predetermined angle so that the scanning laser beam LB passing though the fθ lens 54 can be accurately emitted through the opening 51D. Note, although the holding and angle adjustment mechanism 70 is symmetrically disposed at both ends of the mirror, FIG. 4 shows only one thereof.

Each holing and angle adjustment mechanism 70 is arranged such that the mirror support portion 60 projects inwardly from the inside surface of the circumferential side wall 51B corresponding to an edge 51E in the lengthwise direction of the opening 51D and has a width larger than the shorter side of the opening 51D. The inside surface of the mirror support portion 60 extends along the side end edge of the opening 51D and the edge of the polygon mirror 53 side, and the polygon mirror 53 side of the mirror support portion 60 extends to the lower direction in FIG. 4 by a predetermined width and length and serves as a screw mounting portion 61. The screw mounting portion 61 is located on the polygon mirror 53 side with respect to the opening portion 51D and the upper surface of the screw mounting portion 61 is a plane having the same height as that of the circumferential wall 51B (as shown in FIG. 4, top), and the part of the screw mounting portion 61 located above the opening 51D in FIG. 3 is formed as an inclined surface 62 having substantially the same angle as that at which the mirror 55 is disposed with the polygon mirror 53 side thereof located at an elevated position. The right side of the inclined surface is formed as a bottom 63 having an inclining angle perpendicular to the inclined surface 62.

A support projection 64 having a predetermined height and triangular cross section extends in the same direction as the lengthwise direction of the opening 51D in the vicinity of the bottom 63 of the inclined portion 62.

A small round screw 71 is vertically threaded to the upper surface of the screw mounting portion 61 of the mirror support portion 60, the screw 71 having a rounded or hemispherical head portion 71A and a plus-shaped hole 71B defined at the vertex thereof to be engaged with the actuating portion at the extreme end of a screwdriver, such as those known under the trademark, "Phillips".

The mirror 55 is supported by the mirror support portions 60 in such a manner that the lower edge 55B thereof is abutted against the bottoms 63, and the vicinity of the lower edge 55B of the reflection surface 55A is abutted against the support projections 64 and the vicinity of the upper edge 55C thereof is abutted against the peripheral edges of the head portions 71A of the small round screws 71, respectively, and further the mirror 55 is fixed by being pressed by pressure springs 72 from the upper side (the backside 55D side) corresponding to the mirror support portions 60.

The horizontal mounting portion 72A of each of the pressure springs 72 is extended to the pressure portion 72B thereof by being bent substantially to an angle at which the mirror 55 is mounted and a hemispherical pressure projection 72C is formed at the center of the pressure portion 72B. The mirror 55 is fixed in such a manner that the mounting portion 72A is fixed to the upper surface of the circumferential wall 51B of the unit base 51 by fixing screws 73, the pressure projection 72C is abutted against the backside 55D of the mirror 55, located substantially at the center between the position where the support projection 64 for the mirror 55 is abutted against the mirror 55 and the position where the head portion 71A of the small round screw 71 is abutted thereagainst, and the pressure projection 72C is elastically deformed by a predetermined amount in this state and presses the mirror 55 toward the sides of the support projection 64 and the small round screw 71 by the returning force thereof.

The positional relationship between the mirror 55 and the small round screws 71 is set such that when the mirror 55 is properly supported by the mirror support portions 60, the upper edge 55C of the mirror 55 does not cover the upper area of the plus-shaped hole of the head portion 71A of the small round screws 71 so that the small round screws 71 can be turned with a driver from the upper side of the screws.

Figure 5:
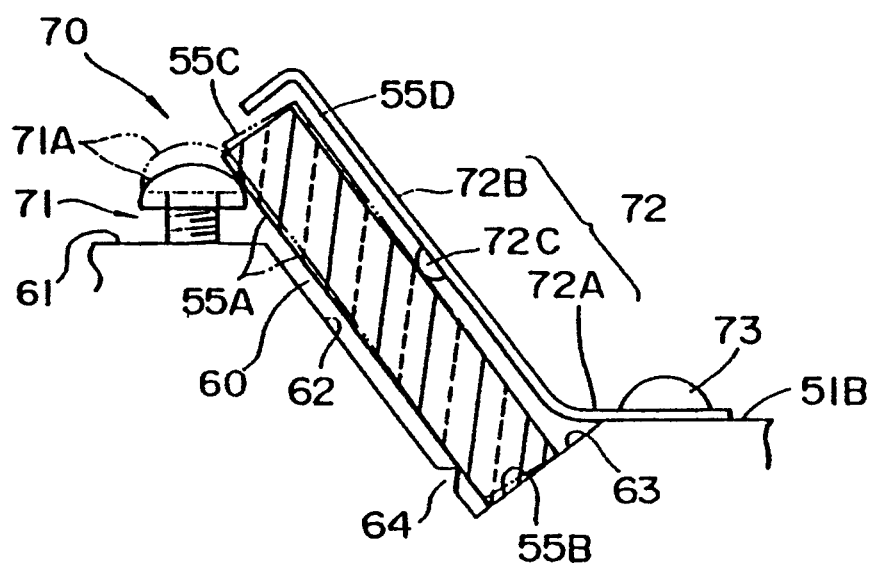
FIG. 5 is a diagram explaining the angle adjustment of a mirror.

With the aforesaid arrangement, when the small round screws 71 are turned and threadingly adjusted with the driver from the upper side thereof, the head portions 71A thereof are displaced upward and downward, whereby the mirror 55 is swung about the positions where it is abutted against the support projections 64 as fulcrums, as shown by the imaginary line in the explaining diagram of FIG. 5, and thus the angle of the mirror 55 can be adjusted.

Note, although the small round screw 71 is used as an adjustment member and the mirror 55 is supported by the vicinity of the peripheral edge of the head portion 71A thereof in the above embodiment, a small screw to be used is not essential thereto and can be suitably changed. Further, a flange of a large diameter may be formed to the head portion 71A of the screw to support the mirror 55.

The present disclosure relates to the subject matter contained in Japanese Utility Model Application HEI3-59325, filed on Apr. 24, 1991, which is expressly incorporated herein by reference in its entirety.

What is claimed is:

1. A mirror angle adjustment structure for an optical system for adjusting an angle of a mirror having a reflection surface comprising:
    a support projection, abutting against the reflection surface of said mirror, and projected from a mirror support member at a position corresponding to an end along the lengthwise direction of said mirror;
    an adjustment screw member, abutting against the reflection surface of said mirror, and disposed at another end of said mirror, said adjustment screw member threadably engaged with said mirror support member and comprising a rounded head portion with a turning operation groove defined at a center thereof, said rounded head portion positioned to engage said mirror, said adjustment screw member being turned when said turning operation groove is engaged and turned by a driver; and
    urging means for urging said mirror towards said support projection and said adjustment screw member, wherein an angle of said mirror can be adjusted by turning said adjustment screw member.

2. The mirror angle adjustment structure according to claim 1, wherein said mirror is supported by a side of the head portion of said adjustment screw member and said mirror is disposed at an area which does not cover an upper area of said turning operation groove.

3. The mirror angle adjustment structure according to claim 1, wherein said urging means comprises at least one pressure spring that includes a rounded pressure portion which contacts said mirror on a side opposite to where said mirror is supported.

4. A mirror angle adjustment structure according to claim 1, wherein said urging means comprises at least one leaf spring which contacts said mirror on a surface opposite the reflection surface of said mirror.

5. The mirror angle adjustment structure according to claim 1, further comprising a space defined between said urging means on one side and said adjustment screw member and said support projection on an opposite side, said space corresponding to a thickness dimension of said mirror.

6. The mirror angle adjustment structure according to claim 1, a support projection, adjustment screw, and urging means being provided at each lengthwise end portion of said mirror.

7. A laser scanning device including a mirror having a reflection surface for bending an optical axis and a mirror angle adjustment structure for adjusting an angle of said reflecting mirror, said mirror angle adjustment structure comprising:
    a support projection, abutting against the reflection surface of said mirror, and projected from a mirror support member at a position corresponding to an end along the lengthwise direction of said mirror;
    an adjustment screw member, abutting against the reflection surface of said mirror, and disposed at another end of said mirror, said adjustment screw member threadably engaged with said mirror support member and comprising a rounded head portion with a turning operation groove defined at a center thereof, said rounded head portion positioned to engage said mirror, said adjustment screw member being turned when said turning operation groove is engaged and turned by a driver; and
    urging means for urging said mirror towards said support projection and said adjustment screw member.

8. The laser scanning device according to claim 7, wherein said mirror is supported by a side of the head portion of said adjustment screw member and said mirror is disposed at an area which does not cover an upper area of said turning operation groove.

9. The laser scanning device according to claim 7, wherein said urging means comprises at least one pressure spring that includes a pressure portion which pressingly contacts said mirror.

10. A laser scanning device according to claim 7, wherein said urging means comprises at least one leaf spring which contacts said mirror on a surface opposite the reflection surface of said mirror.

11. The laser scanning device according to claim 7, further comprising a space defined between said urging means on one side and said support projection and adjustment screw member on an opposite side, said space corresponding to a thickness dimension of said mirror.

12. The laser scanning device according to claim 7, a support projection, adjustment screw member and urging means being provided at each lengthwise end portion of said mirror.

13. A mirror angle adjustment structure for an optical system for adjusting an angle of a mirror having a reflection surface, said adjustment structure comprising:

a mirror support member;

a support projection, projecting from said mirror support member at a lengthwise end portion of said mirror;

an adjustment screw member threadedly engaging said support member at a lengthwise end position of said mirror; and means for urging said mirror towards said support projection and said adjustment screw member, said adjustment screw member comprising means for adjusting an angle of said mirror by turning said adjustment screw member, said adjustment screw member comprising a rounded head portion with a turning groove defined therein, said rounded head portion positioned to engage said mirror, said adjustment screw member being turned to adjust a position of said mirror when said turning groove is engaged and turned by a tool;

said adjustment screw member, said support projection and said urging means comprising means for enabling insertion and removal of said mirror from said adjustment structure by deflection of said urging means without turning of said adjustment screw member.

14. A mirror angle adjustment structure according to claim 13, said support projection and said adjustment screw member abutting against the reflection surface of said mirror.

15. The mirror angle adjustment structure according to claim 13, said urging means comprising at least one leaf spring for contacting said mirror on a surface opposite to the reflection surface of said mirror.

16. The mirror angle adjustment structure according to claim 13, a supporting projection and an adjustment screw member being provided at each lengthwise end portion of said mirror.

17. The mirror angle adjustment structure according to claim 16, said urging means comprising a rounded pressure portion positioned intermediate each said adjustment screw member and support projection and abutting against an opposite surface of said mirror from said adjustment screw and support projection.

18. A laser scanning device including a mirror having a reflection surface for bending an optical axis, and a mirror angle adjustment structure for adjusting an angle of said reflection surface of said mirror, said mirror angle adjustment structure comprising:

a support projection, abutting against the reflection surface of said mirror, and projected from a mirror support member;

an adjustment screw member having a first end abutting against the reflection surface of said mirror and having a second end threadedly engaged with said mirror support member, said first end of said adjustment screw member comprising means for receiving an adjustment tool for threadedly adjusting said adjusting screw member to thereby adjust a position of the reflection surface of said mirror; and urging means for urging said mirror towards said support projection and said adjustment screw member.

19. The mirror angle adjustment structure according to claim 18, said urging means comprising at least one leaf spring which contacts said mirror on a surface opposite the reflection surface of the mirror.

20. The laser scanning device according to claim 18, a support projection, adjustment screw member and urging means being provided at each lengthwise end portion of said mirror.

21. A mirror angle adjustment structure for an optical system, for adjusting an angle of a mirror having a reflection surface, said structure comprising:

a support projection abutting against the reflection surface of said mirror, and projecting from a mirror support member;

an adjustment screw member, abutting against the reflection surface of said mirror, said adjustment screw member threadably engaged with said mirror support member for movement along a predetermined direction, said predetermined direction of movement of said adjustment screw member intersecting a plane of said mirror at an acute angle, said adjustment screw member comprising a rounded head portion with a turning operation groove defined therein, said rounded head portion of said adjustment screw member being positioned to engage said mirror, said adjustment screw member being turned and moving along said predetermined direction of movement when said turning operation groove is engaged and turned by a driver; and urging means for urging said mirror towards said support projection and said adjustment screw member, wherein an angle of said mirror can be adjusted by turning said adjustment screw member, and moving said adjustment screw member in said predetermined direction.

* * * * *